US012639732B2

(12) United States Patent
Heidari

(10) Patent No.: US 12,639,732 B2
(45) Date of Patent: *May 26, 2026

(54) CENTRALIZED GATEWAY SERVER FOR PROVIDING ACCESS TO SERVICES

(71) Applicant: Giesecke+Devrient Mobile Security America, Inc., Dulles, VA (US)

(72) Inventor: Mehdi Zadeh Heidari, Maple (CA)

(73) Assignee: Giesecke+Devrient Mobile Security America, Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,623

(22) Filed: Aug. 22, 2022

(65) Prior Publication Data

US 2022/0400109 A1 Dec. 15, 2022

Related U.S. Application Data

(63) Continuation of application No. 16/055,620, filed on Aug. 6, 2018, now Pat. No. 11,425,118.

(51) Int. Cl.
*G06Q 30/06* (2023.01)
*G06Q 40/02* (2023.01)
(Continued)

(52) U.S. Cl.
CPC ............. *G06Q 30/06* (2013.01); *G06Q 40/02* (2013.01); *G10L 15/22* (2013.01); *H04L 63/0861* (2013.01); *H04L 65/102* (2013.01)

(58) Field of Classification Search
CPC ... H04L 63/0861; H04L 65/102; H04L 65/40; H04L 63/0884; G06Q 40/02;
(Continued)

(56) References Cited

U.S. PATENT DOCUMENTS

| | | | |
|---|---|---|---|
| 11,127,405 B1 * | 9/2021 | Antos | .................. G10L 15/30 |
| 2006/0092978 A1 | 5/2006 | John et al. | |

(Continued)

OTHER PUBLICATIONS

European Patent Office, International Search Report and Written Opinion for International Application No. PCT/EP2019/025255, mailed Oct. 29, 2019.

*Primary Examiner* — Farid Homayounmehr
*Assistant Examiner* — Suman Debnath
(74) *Attorney, Agent, or Firm* — Faegre Drinker Biddle & Reath LLP

(57) ABSTRACT

A centralized gateway server receives a first user request, configured to operate with a first development platform, indicating a first operation to be performed on behalf of a first user. The centralized gateway server generates a first service request for performing the first operation, and transmits the first service request to a server associated with a service, to cause the server to perform the first operation on behalf of the first user. The centralized gateway server also receives a second user request indicating a second operation. The second user request is configured to operate with a second development platform different from the first development platform. The centralized gateway server generates a second service request for performing the second operation, and transmits the second service request to the server to cause the server to perform the second operation.

16 Claims, 6 Drawing Sheets

(51) Int. Cl.
G10L 15/22 (2006.01)
H04L 9/40 (2022.01)
H04L 65/102 (2022.01)

(58) Field of Classification Search
CPC .... G06Q 20/322; G06Q 20/12; G06Q 20/127;
G06Q 20/145; G06Q 30/06
See application file for complete search history.

(56) References Cited

U.S. PATENT DOCUMENTS

| | | | | |
|---|---|---|---|---|
| 2007/0033150 | A1 | 2/2007 | Nwosu | |
| 2007/0047694 | A1* | 3/2007 | Bouchard | H04M 15/8033 |
| | | | | 379/88.01 |
| 2008/0103923 | A1 | 5/2008 | Rieck et al. | |
| 2013/0226792 | A1 | 8/2013 | Kushevsky et al. | |
| 2015/0326646 | A1 | 11/2015 | Marsh | |
| 2016/0373455 | A1* | 12/2016 | Shokhrin | G06F 21/629 |
| 2017/0155631 | A1* | 6/2017 | Du | G06F 21/6209 |
| 2017/0329573 | A1* | 11/2017 | Mixter | G10L 15/22 |
| 2017/0330215 | A1 | 11/2017 | Bruno et al. | |
| 2017/0359334 | A1* | 12/2017 | Maddox | G10L 17/24 |
| 2018/0144346 | A1* | 5/2018 | Yu | G06Q 20/4014 |
| 2019/0132307 | A1* | 5/2019 | Pitchaimani | A61C 9/0066 |
| 2019/0371321 | A1 | 12/2019 | Naughton et al. | |
| 2019/0378519 | A1* | 12/2019 | Dunjic | G06F 21/606 |
| 2020/0045041 | A1 | 2/2020 | Heidari | |
| 2020/0202313 | A1 | 6/2020 | Eidam et al. | |
| 2020/0380613 | A1* | 12/2020 | Hikel | G06Q 40/125 |

* cited by examiner

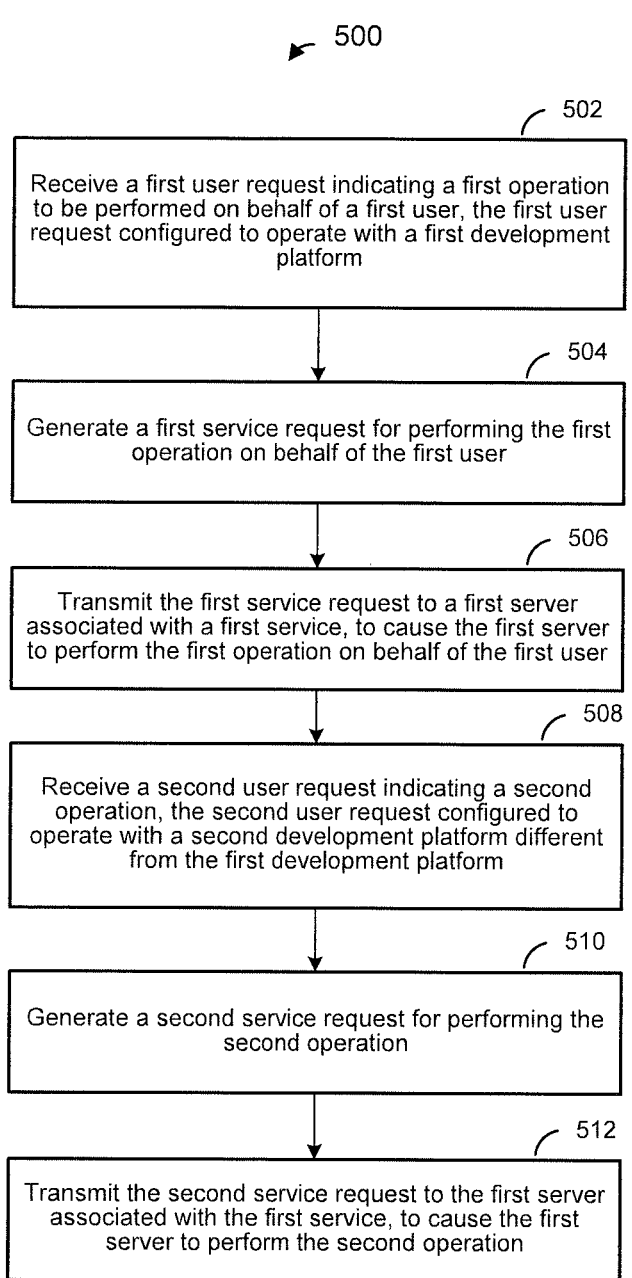

502

Receive a first user request indicating a first operation to be performed on behalf of a first user, the first user request configured to operate with a first development platform

504

Generate a first service request for performing the first operation on behalf of the first user

506

Transmit the first service request to a first server associated with a first service, to cause the first server to perform the first operation on behalf of the first user

508

Receive a second user request indicating a second operation, the second user request configured to operate with a second development platform different from the first development platform

510

Generate a second service request for performing the second operation

512

Transmit the second service request to the first server associated with the first service, to cause the first server to perform the second operation

CENTRALIZED GATEWAY SERVER FOR PROVIDING ACCESS TO SERVICES

CROSS REFERENCE TO RELATED APPLICATIONS

This application is a continuation of U.S. application Ser. No. 16/055,620, filed Aug. 6, 2018 (now, U.S. Pat. No. 11,425,118, issued Aug. 23, 2022), the contents of which are incorporated by reference in their entirety.

FIELD OF THE DISCLOSURE

The present disclosure relates generally to providing access to services over a network, and more particularly, to a centralized gateway for providing access to services over a network.

BACKGROUND

Various services, such as banking services, retail shopping services, food delivery services, etc., are often accessible by users via computing or assistant devices, such as computers, cell phones, smart speaker devices, etc. coupled to a network. Such computing or assistant devices generally support specific development platforms, and require applications that enable over-network access to various services (e.g., banking or shopping services) to be implemented and maintained on the specific development platforms. As an example, voice activated assistant devices, such as smart speakers, are utilized to communicate with various services over a network using voice commands to cause one of various operations, such as banking transactions/operations, online shopping, etc., each to be performed on a specific platform for a particular service (e.g., individual, separate platforms for Chase Bank or for Walmart). Typically, a smart speaker is provided by a particular voice assistant provider and, in order to enable communication between the smart speaker device and a service, an application that is specific to the desired service needs to be developed and maintained on a specific platform supported by the particular voice assistant provider. Accordingly, to enable communication with smart speakers provided by different voice assistant providers, multiple applications typically need to be developed and maintained on respective platforms supported by the respective voice assistant providers. Thus, for example, if a bank wishes to provide its services to customers utilizing smart speakers provided by different voice assistance providers (e.g., Apple Ski, Amazon Alexa, Google Assistant, Microsoft Cortana, Bank of America's Erica, etc.), the bank must develop and maintain multiple applications on multiple platforms supported by the different voice assistant providers in order to cover the whole market and serve a majority of consumers who are using one of many smart speaker products available in retail. Thus, there is a need for a centralized secure hub or platform that can manage multiple service platforms for banking and shopping service providers. Moreover, communication via smart speaker devices typically lacks security protocols desired for performing sensitive operations, such as banking operations. Thus, there is a need for added security features on smart speaker devices of voice assistance providers.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely summarizes some of the concepts of the disclosure as a prelude to the more detailed description provided thereafter.

In an embodiment, a method for providing access to services includes: receiving, at a centralized gateway server, a first user request indicating a first operation to be performed on behalf of a first user, the first user request configured to operate with a first development platform; generating, at the centralized gateway server, a first service request for performing the first operation on behalf of the first user in response to receiving the first user request; and transmitting, from the centralized gateway server, the first service request to a first server associated with a first service, to cause the first server to perform the first operation on behalf of the first user. The method additionally includes: receiving, at the centralized gateway server, a second user request indicating a second operation, the second user request configured to operate with a second development platform different from the first development platform; generating, at the centralized gateway server, a second service request for performing the second operation in response to receiving the second user request; and transmitting, from the centralized gateway server, the second service request to the first server associated with the first service to cause the first server to perform the second operation.

In another embodiment, a tangible, non-transitory computer readable medium, or media, storing machine-readable instructions that, when executed by one or more processors, cause the one or more processors to: receive a first user request indicating a first operation to be performed on behalf of a first user, the first user request configured to operate with a first development platform; generate a first service request for performing the first operation on behalf of the first user in response to receiving the first user request; cause the first service request to be transmitted to a first server associated with a first service, to cause the first server to perform the first operation on behalf of the first user; receive a second user request indicating a second operation, the second user request configured to operate with a second development platform different from the first development platform; generate a second service request for performing the second operation in response to receiving the second user request; and cause the second service request to be transmitted to the first server associated with the first service to cause the first server to perform the second operation.

In yet another embodiment, an apparatus comprises at least one biometric interface, a memory to store biometric data, and a processor implemented on one or more integrated circuits configured to receive a voice command from a user, the voice command indicating an operation to be performed on behalf of the user, cause a user request to be generated based on the voice command, the user request to be transmitted to a centralized gateway server, and receive, from the centralized gateway server, an authentication request to authenticate that the user is authorized to request the operation. The one or more integrated circuits are further configured to receive a biometric input, the biometric input generated based on a biometric characteristic provided via the biometric interface, and compare the biometric input to biometric data stored in the memory to determine if the biometric input matches the biometric data. The one or more integrated circuits are further configured to, if it is determined that biometric input matches the biometric data, generate an authentication message indicating that the user is authorized to request the operation, and cause the authentication message to be transmitted to a centralized gateway server to cause the centralized gateway server to perform the operation on behalf of the user.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

FIG. 5 is a flow chart of a computer-implemented method, that may be implemented in the system of FIG. 1, for providing access to services, according to an embodiment.

Figure 1:
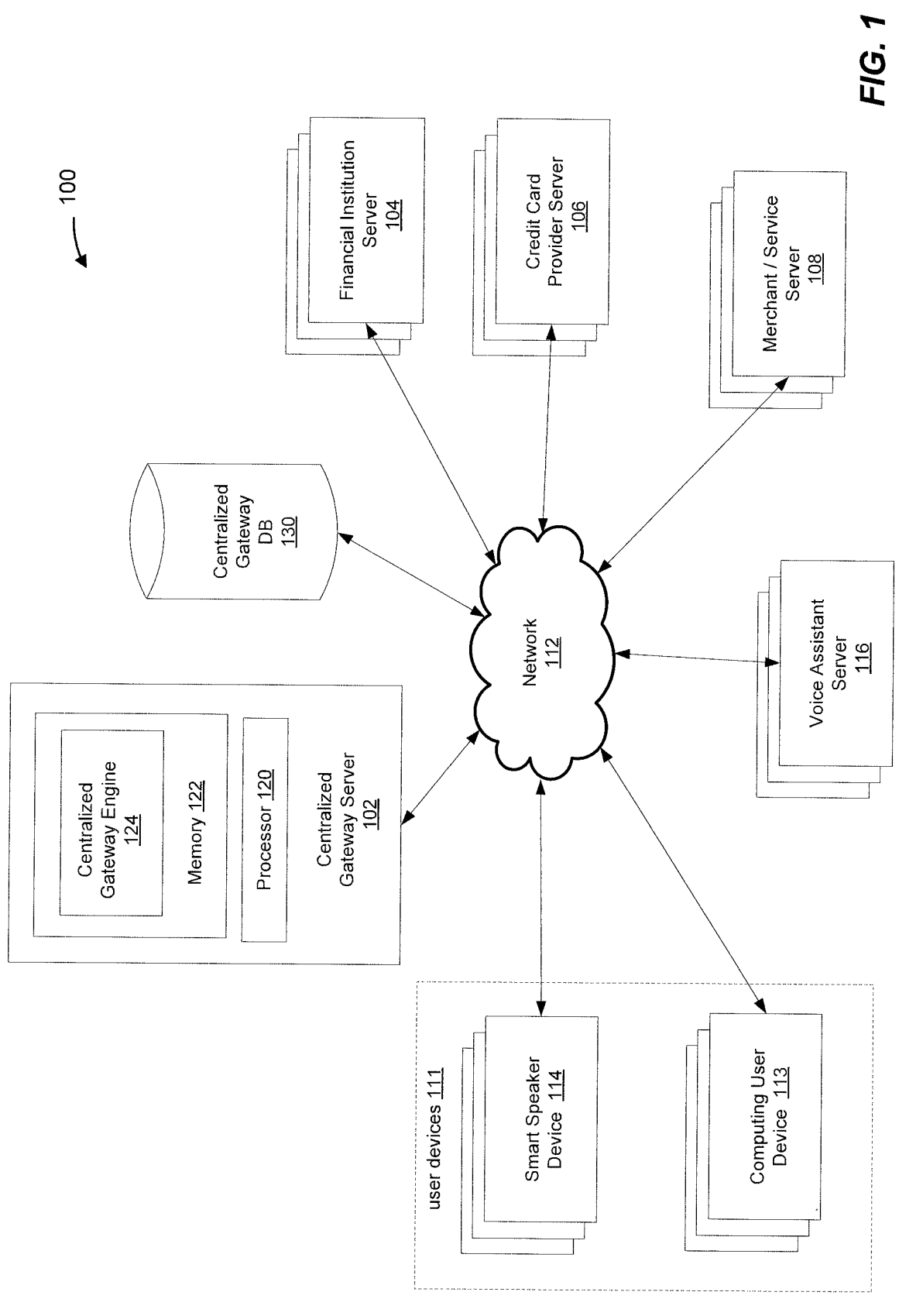
FIG. 1 is a block diagram of a system in which centralized gateway service provider techniques described herein may be utilized, according to an embodiment.

Embodiments of the present disclosure and their advantages are best understood by referring to the detailed description that follows. It should be appreciated that like reference numbers are used to identify like elements illustrated in one or more of the figures, which are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Embodiments described herein generally relate to methods and apparatus for providing over-network access to various services, such as banking services, on-line shopping services, food delivery services, etc., in a centralized and secure manner. In an embodiment, a centralized gateway server aggregates access to multiple services and/or provides access to services via computing or assistant devices that support different development platforms. In various embodiments, a centralized gateway server may provide an abstraction between (i) computing or assistant devices and (ii) services, such as banks or merchants, which may be accessed via the computing or assistant devices. For example, the centralized gateway server may implement multiple interfaces to interface with (i) computing or assistant devices that support different development platforms and (ii) services, such as banks or merchants, which may be accessed via the computing or assistant devices that support different development platforms. In response to receiving a first user request to access a particular service (e.g., a banking service), via a first interface, such as a first Application Programming Interface (API), with a first computing or assistant device that supports a first development platform, (e.g., Apple Ski), the centralized gateway server may generate a first service request and may transmit the first service request to a server that provides access to the particular service via a first interface (e.g., a first API) in communication with a merchant or service provider (e.g., a bank or financial institution). Similarly, in response to receiving, a second user request to access the particular service (e.g., a banking service) via a second interface (e.g., a second API) with a second computing or assistant device that supports a second development platform (e.g., Amazon Alexa), the centralized gateway server may generate a second service request and may transmit the second service request to the server that provides access to the particular service. Consequently, the particular service may be provided to users of devices that support the different development platforms (e.g., Apple Siri and Amazon Alexa) via a centralized gateway server, without a need to develop and maintain a separate application on each of the different development platforms.

By implementing multiple interfaces to link or interface with multiple services, the centralized gateway server may enable a user to switch seamlessly between requesting operations from the multiple services (e.g., banking or shopping services). The centralized gateway server, for example, may maintain user accounts and store information, such as banking account information, credit card information and the like, for various users and for various services accessible to the users. Banking information stored for a user may include, for example, multiple banking accounts of the user, with respective ones of the multiple banking accounts being associated with different banks. The centralized gateway server may receive user requests that may involve selecting, from stored user account information, one or more particular bank accounts associated with different one or more banks, and fulfilling the request via respective interfaces with respective server applications that provide access to the services provided by the different one or more banks. In response to receiving a request indicating that a user wishes to make a payment, the centralized gateway server may, for example, generate a response requesting the user to specify a particular banking account, of the multiple banking accounts associated with the user, from which the payment is to be made. Upon receiving an indication of the particular banking account selected by the user, the centralized gateway server may generate a service request using account information corresponding to the banking account selected by the user to transmit the service request via a corresponding interface to a server that provides access to the corresponding bank. As another example, the centralized gateway server may receive a request indicating that a user wishes to transfer money from a first banking account associated with a first bank to a second banking account associated with a second bank, and may fulfill the request by communicating via respective interfaces with servers that provide access to the services of the first bank and the services of the second bank.

In some embodiments, prior to transmitting requests for at least some operations, such as security-sensitive banking operations, the centralized gateway server may authenticate the user and ascertain whether the user is authorized to request the operations. For example, the centralized gateway server may generate an authorization request requesting certain authentication information, such as personal identification number (e.g., PIN or pin) information, security question information, biometric information, and the like to be provided by the user via a user device, and may analyze a response received from the user device to determine whether the user is an authorized user.

In some embodiments, a smart speaker device may be equipped with authentication capabilities, such as biometric authentication capabilities. In such embodiments, the smart speaker device may be configured to transmit at least some requests initiated by a user only after authenticating the user and/or ascertaining that the user is authorized to perform the requested operations. The centralized gateway server may request biometric authentication to be performed by a smart speaker device prior to performing operations associated with at least some requests received from the smart speaker device. These and other techniques described herein provide convenience of centralized aggregated access to electronic services that may be requested by users via different user devices and may provide access to the services in a secure manner that may be desired for security-sensitive operations, such as banking operations, in various embodiments.

FIG. 1 is a block diagram of a system 100 in which centralized gateway service provider techniques described herein may be utilized, according to an embodiment. System 100 may include one or more service provider servers including, for example, one or more financial institution servers 104, one or more credit card servers 106, one or more merchant/service provider servers 108 and the like communicatively coupled to a communication network 112. Communication network 112 may be a wide area network (WAN) such as the Internet, a local area network (LAN), or any other suitable type of communication network including wired and/or wireless connections. In some embodiments, communication network 112 may be a single communication network or may comprise multiple different communication networks.

Financial institution servers 104 may be utilized by respective ones of one or more financial institutions, such as banks, to provide access to financial institution services to clients, members, customers, etc., over network 112. As an example, a first one of financial institution servers 104 may be utilized by a first bank (e.g., Chase Bank) to provide electronic access to banking services to customers of the first bank over network 112; a second one of financial institution servers 104 may be utilized by a second bank (e.g., TD Bank) to provide electronic access to banking services to customers of the second bank over network 112; a third one of financial institution servers 104 may be utilized by a third bank (e.g., Bank of Nova Scotia) to provide electronic access to banking services to customers of the third bank over network 112; etc. A bank may utilize a financial institution server 104, for example, to allow customers of the bank to access their corresponding bank accounts electronically, e.g., to obtain balances of bank accounts, to transfer money to and/or from bank accounts, to make payments from bank accounts, to make deposits into bank accounts, etc. In an embodiment, a financial institution application running on financial institution server 104 may implement an interface, such as an API, to allow a third-party entity to communicate with the financial institution application and to thereby allow the third-party entity to permit access to financial institution services available to users of the third-party entity over network 112.

Credit card provider servers 106 may be utilized by respective one or more credit card providers to provide access to credit card services to cardholders of the one or more credit card providers over network 112. For example, a first one of credit card provider servers 106 may be utilized by a first credit card provider (e.g., MasterCard) to provide access to credit card accounts to cardholders of the first credit card provider over network 112, a second one of credit card provider servers 106 may be utilized by a second credit card provider (e.g., American Express) to provide access to credit card accounts to cardholders of the second credit card provider over network 112, etc. A credit card provider may utilize a credit card provider server 106, for example, to allow card holders to obtain statement balances of credit card accounts, to obtain transaction histories of credit card accounts, to make payments towards balances of credit card accounts, create eCommerce tokens for Card Not Present (CNP) transactions, etc. In an embodiment, a credit card provider application running on credit card provider server 106 may implement an interface, such as an API, to allow a third-party entity to communicate with the credit card provider application and to thereby allow the third-party entity to permit access to credit card services available to users of the third-party entity over network 112.

Merchant/service servers 108 may be utilized by respective one or more merchant or service providers to provide access to merchant or services provided by the merchant or service providers to customers or users to over network 112. For example, a first one of merchant/service provider server 108 may be utilized by a food merchant such as a restaurant (e.g., Domino's Pizza) to allow users to order food over network 112, a second one of merchant/service provider server 108 may be utilized by a utility provider (e.g., ComEd) to provide access to utility accounts over network 112, a third one of merchant/service provider server 108 may be utilized by a cab company or car service provider (e.g., Uber) to allow users to order car service over network 112, etc. In an embodiment, a merchant or server provider application running on merchant/service servers 108 may implement an interface, such as an API, to allow a third-party entity to communicate with the merchant or service provider application and to thereby allow the third-party entity to permit access to merchant/service services available to users of the third-party entity over network 112.

Centralized gateway server 102 provides user access to services provided by various service provider servers 104-108. Centralized gateway server 102 is configured to communicate with at least user devices 111 and service provider servers 104-108. Users or customers of financial institutions, credit card providers, merchants, services, etc. may conduct transactions with respective servers 102-108 via various user devices 111 that may include computing user devices 113 and/or artificial intelligence (AI) speaker devices 114 (e.g., "smart speaker" devices) communicatively coupled to network 112. Computing user devices 113 may include, for example, personal computers, cellular phones, smart phones, web-enabled televisions, and other suitable web-enabled devices communicatively coupled to network 112. Computing user devices 113 may implement applications that may allow users to communicate with server applications running on respective servers 102-108 to cause financial institutions, credit card providers, merchants, utility service providers, etc. utilizing servers 102-108 to perform operations on behalf of the users. Similarly, smart speaker devices 114 may allow users to use voice commands to cause financial institutions, credit card providers, merchants, utility service providers, etc. utilizing servers 102-108 to perform operations on behalf of the users. Smart speaker devices 114 may be communicatively coupled to voice assistant servers 116 via network 112. A voice command spoken by a user may be received by smart speaker device 114 and may be transmitted by smart speaker device 114 to voice assistant service provider 116. Voice assistant server 116 may identify, based on the voice command received from smart speaker device 114, a particular application implemented on voice assistant server 116 that may respond to the voice command, and may allow the user to communicate with the identified application to implement an operation requested by the voice command.

Smart speaker devices 114 may include smart speaker devices configured to communicate with voice assistant servers 116 that support different development platforms for developing and maintaining applications accessible on voice assistant servers 116 via different smart speaker devices 114. In an exemplary embodiment, a first smart speaker device 114 may be an Amazon Echo speaker device configured to communicate with an Alexa voice assistant server that supports an Alexa development platform for developing applications (e.g., "skills" built with an Alexa Skills Kit to add to the capabilities of any Alexa-enabled device, such as to add food ordering capabilities, to facilitate financial transactions, to add question answering capabilities, etc.) accessible via Amazon Echo devices; a second smart speaker device 114 may be a Google Home device config-ured to communicate with a Google Assistant server, a voice assistant server, that supports a Google Assistant develop-ment platform for developing applications (e.g., "actions" built with Google toolkits to add to the capabilities of any Google Assistant-enabled device, such as to add food order-ing capabilities, to facilitate financial transactions, to add question answering capabilities, etc.) accessible via Google Home devices; and so on. Different skills may be developed on the first development platform for accessing different services, such as accessing different service applications running on server devices 104-108. In an embodiment, a skill may be developed for accessing centralized gateway server 102, and centralized gateway server 102 may enable access to different service applications running on server devices 104-108. Similarly, different actions may be devel-oped on the second development platform for accessing different services, such as accessing different service appli-cations running on server devices 104-108. In an embodi-ment, an action may be developed for accessing centralized gateway server 102, and centralized gateway server 102 may enable access to different service applications running on server devices 104-108. In other exemplary embodiments, other suitable voice assistant speaker devices and/or other suitable development platforms are utilized.

Centralized gateway server 102 may provide access to services provided by various service provider servers 104-108 via a centralized gateway engine 124 configured to communicate with (i) computing user devices 113, smart speaker devices 114 and/or voice assistant servers 116 and (ii) server applications running on service provider servers 104-108. Centralized gateway server 102 may include at least one processor 120 and a computer-readable memory 122 that stores the centralized gateway engine 124 in the form of computer-readable instructions, for example, that may be executable by the processor 120. Computer readable memory 122 may include volatile memory to store computer instructions and data on which the computer instructions operate at runtime (e.g., Random Access Memory or RAM) and, in an embodiment, persistent memory such as a hard disk, for example. Centralized gateway engine 124 may be configured to abstract different development platforms uti-lized by voice assistant servers 116 from applications of financial institution, credit card provider, merchant, service, etc. implemented on servers 104-108. In an exemplary embodiment, centralized gateway engine 124 may imple-ment respective interfaces for communicating with voice assistant servers 116 and may also implement respective interfaces for communicating with applications running on servers 104-108.

In some embodiments, centralized gateway engine 124 may establish a secure communication channel via network 112 between centralized gateway server 102 and voice assistant server 116. Using the secure communication chan-nel via network 112, centralized gateway engine 124 may receive requests provided by users of voice speaker devices 114 and may provide responses to be rendered to users by voice assistant speaker devices 114.

In some embodiments, a secure smart speaker device 114 is provided to enable users to more securely conduct sensi-tive operations, such as banking operations, over network 112. As will be explained in more detail below, secure smart speaker device may implement various security features, such as establishing a secure (e.g., encrypted) communica-tion channel between smart speaker device 114 and central-ized gateway service 102, using, for example, biometric characteristics to authenticate users of secure smart speaker device 114 and to ascertain that certain users are authorized to request certain operations via secure smart speaker device 114, and the like. In an embodiment, the centralized gateway server 102 allows fully secure banking and other financial transactions via a user's voice command through biometric or other multi-factor authentication methods. For example, through voice commands or a web portal, a user may be able to open a new banking account or card account, transfer funds between different banking accounts of the user or from a banking account of the user to a third party's account, pay bills issued from a service provider, credit card issuer or utility, and receive currency exchange data, in various embodiments.

Centralized gateway server 102 may maintain user accounts in a database 130. Centralized gateway server 102 may create user accounts based on user information pro-vided to centralized gateway server 102 via, for example, user devices 111, and may associate the user information with user accounts in database 130. Database 130 may be communicatively coupled to centralized gateway server 102 via network 112, as illustrated in FIG. 1, or may be coupled to centralized gateway server 102 by other suitable tech-niques. For example, centralized gateway database 130 may be directly connected to the centralized gateway server device 102, or may be included as part of the centralized gateway server 102, in some embodiments. Database 130 may be a single database or may include multiple different databases. In some embodiments, database 130 may be a secure database. For example, database 130 may store user account information in an encrypted form in a highly secured and isolated environment.

A user may register with centralized gateway server 102 via, for example, a registration application, which may be a web application, provided by centralized gateway server 102. The registration application may, for example, display a series of one or more registration screens requesting various information from the user. For example, the web application may request (e.g., via a first registration screen)

that the user provide an indication of a type of a smart speaker device that the user will be using to access centralized gateway server 102. The registration application may provide several options of different types of smart speaker devices that are supported by centralized gateway server 102 including, for example: Siri; Amazon Echo; Google Home; Cortana; etc., and may ask the user to select one of the options. In some embodiments, the registration application may provide (e.g., via a second registration screen) various prompts requesting that the user input various personal user information including, for example, first name, last name, email address, username, password, cell phone number, a personal identification number (e.g., PIN) and the like. The web application may also provide the user with ability to upload one or more images or documents, such as a picture (e.g., a selfie), document (e.g., Driver's License) scan, etc. In some embodiments, the registration application may request (e.g., via a third registration screen) bank account information that links the user with one or more bank accounts in respective one or more banks. The registration application may request (e.g., via a fourth registration screen) user account information that may be used to identify the user at servers of one or more merchants or services to which the user wishes to connect via centralized gateway server 102. For example, the registration application may display a list of services, such as Uber, Domino's Pizza, ComEd, Crown Taxi, etc. that are supported by centralized gateway server 102, and the user may be asked to select one or more of the supported services to which the user wishes to connect via centralized gateway server 102. Upon receiving a selection of a particular service to which the user wishes to connect, the registration application may prompt the user to enter additional information associated with the service, such as user account information (e.g., user name) for the user at the particular service (e.g., user name for the user's Uber account). In some embodiments, the registration information may request that the user input additional information, such as credit card number information, user secondary authentication information, two-factor or multi-factor authentication information; user answers to security questions, etc. The registration application may provide the various information, images, documents, etc., obtained from the user, to centralized gateway server 102. Centralized gateway server 102 may create a user account or profile in database 130, and may store the information obtained from the registration application in the user account or profile in database 130.

A user account or profile in database 130 may include, for example: account information corresponding to one or more banking accounts of the user, the one or more banking accounts being associated with one or more different banks; credit card account information corresponding to one or more credit cards, the one or more credit cards associated with different one or more credit card providers; merchant account information associated with one or more merchants; utility service account information associated with one or more utility providers; etc. Additionally, a user account in database 130 may include additional personal information such as user's social security number, user's driver's license information (e.g., driver's license, a picture of the driver's license); a picture of the user; a user pin; user secondary authentication information, two-factor or multi-factor authentication information; user answers to security questions; etc. Centralized gateway server 102 may utilize such personal information for user authentication purposes and/or to fulfill user requests (e.g., opening a bank account) that may require such additional personal information.

Figure 2:
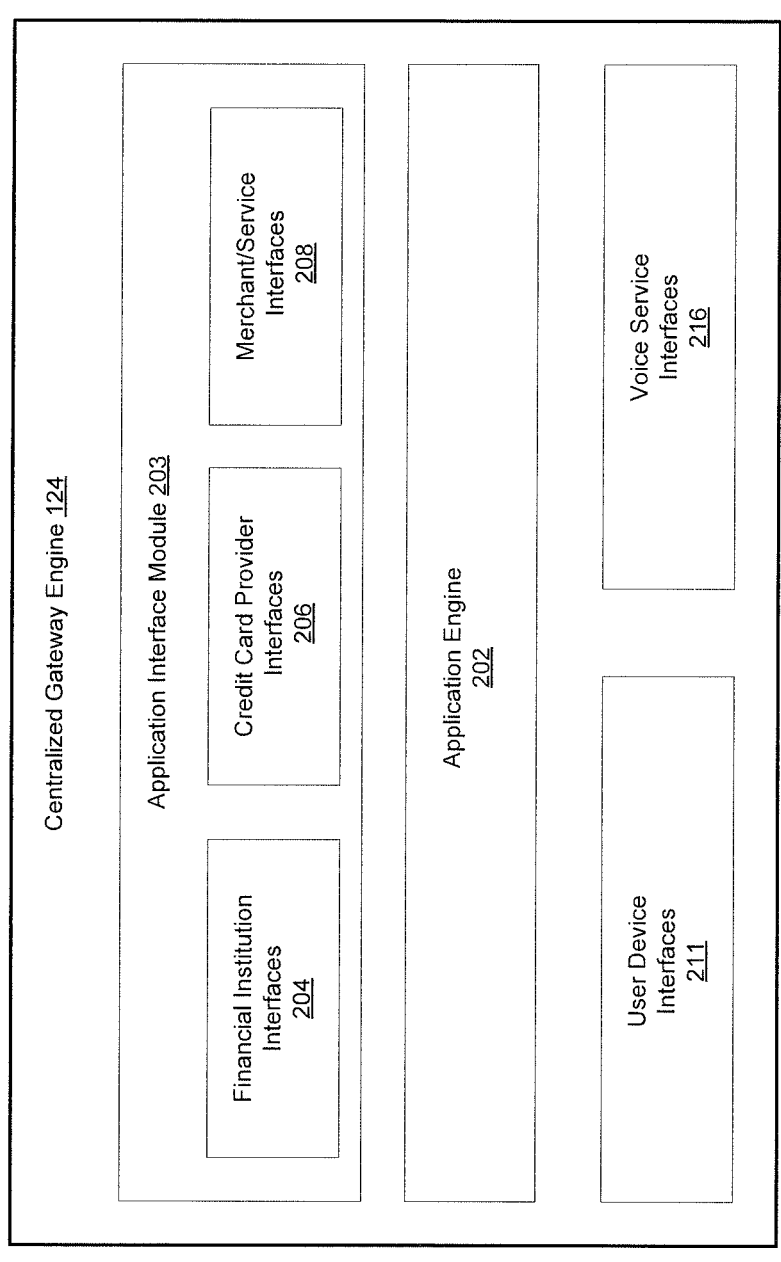
FIG. 2 is a block diagram of a centralized gateway engine that may be used with the system of FIG. 1, according to an embodiment.

FIG. 2 is a block diagram of centralized gateway engine 124 of FIG. 1, according to an embodiment. In the illustrated embodiment of FIG. 2, centralized gateway engine 124 includes an application engine 202 and an application interface module 203 comprising a plurality of interfaces including one or more financial institution interfaces 204, one or more credit card provider interfaces 206, and one or more merchant/server interfaces 208. Centralized gateway engine 124 also includes one or more user device interfaces 211 and one or more voice assistant interfaces or voices services interfaces 216. In some embodiments, centralized gateway engine 124 may omit one or more of the interfaces 204-216 illustrated in FIG. 2 and/or may include one or more additional interfaces not illustrated in FIG. 2. Application engine 202 may be configured generally to process requests received via user device interfaces 211 and/or voice assistant interfaces 216, and to interact with the servers 104-108 via the interfaces 204-208 to fulfill the requests.

Respective ones of user device interfaces 211 may be configured to interface with different types of user devices 111. User device interfaces 211 may include, for example, one or more of: a WiFi interface; a Bluetooth interface; an Ethernet interface; etc. Respective ones of voice assistant interfaces 216 may be configured to interface with respective ones of voice assistant servers 116, for example via APIs provided for interfacing with voice assistant applications that may run on voice assistant servers 116. Voice assistant interfaces 216 may include, for example, one or more of: a first voice assistant interface 216 configured to interact with Google Assistant voice assistant applications; a second voice assistant interface 216 configured to interact with Amazon Alexa voice assistant applications; a third voice assistant interface 216 configured to interact with Microsoft Cortana voice assistant applications; a fourth voice assistant interface 216 configured to interact with Samsung Bixby voice assistant applications; a fifth voice assistant interface 216 configured to interact with Apple Siri voice assistant applications; etc.

Respective ones of financial institution interfaces 204 may be configured to interface with respective ones of financial intuition servers 104, for example via APIs provided for interfacing with financial server applications that may run on one or more financial intuition servers 104. Financial institution interfaces 204 may include, for example, one or more of: a first financial institution interface configured to interact with Chase Bank banking applications; a second financial institution interface configured to interact with TD Bank banking applications; a third financial institution interface configured to interact with Bank of Nova Scotia banking applications; etc. With access to multiple financial institution interfaces 204, the centralized gateway engine 124 aggregates a user's bank accounts in multiple financial institutions facilitating transactions with disparate banks, in an embodiment. For example, some financial institutions provide their own voice activated service (e.g., Bank of America's Erica) and it is cumbersome for a user to alternate between multiple bank's voice activated platforms.

Respective ones of credit card provider interfaces 206 may be configured to interface with respective ones of one or more credit card provider servers 106, for example via APIs provided for interfacing with credit card applications that may run on one or more credit card provider servers 106. Credit card provider interfaces 206 may include, for example, one or more of: a first credit card provider interface 206 configured to interact with Master Card credit card applications; a second credit card provider interface 206 configured to interact with American Express credit card applications; a third credit card provider interface 206 configured to interact with Discover credit card applications; etc.

Respective ones of merchant/service interfaces 208 may be configured to interface with respective ones of one or more merchant/service servers 108, for example via APIs provided for interfacing with server applications that may run on one or more merchant/service servers 108. Merchant/ service interfaces 208 may include, for example, one or more of: one or more first merchant/service interfaces 208 configured to interact with retailer (e.g., Walmart, Best Buy, etc.) server applications; one or more second merchant/ service interfaces 208 configured to interact with restaurant or food delivery (e.g., Domino's Pizza, UberEats etc.) server applications; one or more third merchant/service interfaces 208 configured to interface with utility service provider applications, water service provider applications, electricity provider applications, car service provider applications, currency exchange applications servers; etc.

Application engine 202 may be configured to process user requests received via user device interfaces 211 and/or voice assistant interfaces 216, and to generate, based on the user requests, service requests to be transmitted via interfaces 204-208 to servers 104-108 instructing the servers 104-108 to perform operations requested by the user. Service requests may be generated to include relevant information retrieved from user accounts stored in database 130. For example, in response to receiving a user request indicating that the user wishes to obtain the balance of a particular credit card account, application engine 202 may generate a service request that includes a service access authorization key, associated with the credit card account, retrieved from a user account in database 130. As another example, in response to receiving a user request indicating that the user wishes to place a food order with a restaurant service provider, application engine 202 may generate a service request that includes one or more of: an identifier of a user account, registered with the restaurant service provider, retrieved from the user account in database 130; an indication of a food item that may be stored as a preferred food item in the user account in database 130; a credit card number retrieved from the user account in database 130; etc. In some embodiments, application engine 202 may be configured to assist users devices in selecting a service. For example, application engine 202 may receive a user request indicating that the user wishes to open a new account (e.g., a bank account), obtain a new insurance policy, etc., and application engine 202 may search the Internet or promotion data input provided by the other businesses (e.g., banks or insurance companies) to select a suitable bank or other service based on user preference, spending habit or a recommendation generated from machine learning algorithm. The application engine 202 may inform the user via user device 111 of the selected bank or other service and may provide details regarding offerings at the selected bank or other service. In response to receiving a confirmation from user device 111, application engine 202 may generate a service request, and may transmit the service request to a server associated with the service (e.g., bank or insurance company) to cause an account to be created for the user at the selected service. The service request may include user profile information, that may be verified (e.g., based on proof of identity) and stored in centralized gateway database 130 and may contain personal information required for the selected services, such as social security number, driver's license number, etc., that the gateway 202 may retrieve from the user account in database 130.

In some scenarios, application engine 202 may, in response to receiving a user request provided by a user via a user device 111, generate a clarification or authentication response and provide the clarification or authentication response to the user via the user devices 111 to request clarification or authentication from the user. For example, in response to receiving a user request indicating that a user wishes to make a payment from a bank account, gateway engine 202 may generate a response requesting a selection of a particular bank account from among multiple bank accounts associated with the corresponding user account in database 130. As another example, application engine 202 may generate a response requesting authentication information (e.g., pin number, biometric authentication, etc.) to ascertain that the user is authorized to request the payment. In such embodiments, application engine 202 may subsequently generate the service request based on the requested clarification or authentication information provided by the user.

Application engine 202 may be configured to authenticate whether a user is authorized to request a particular operation, such as transferring money from a bank account of a user to a bank account of another user, transferring an amount of money that exceeds a threshold, making a payment that exceeds a threshold, etc., prior to transmission of a corresponding service request for the requested operation. The various authentication parameters, such as particular operations for which authentication may be required, specific thresholds to be used for determining of whether authentication is required, etc., may be configured by a user and may be stored in a corresponding user account in database 130, for example. In an embodiment, in response to receiving a user request provided via a user device 111 requesting a particular operation, application engine 202 may determine whether authorization is required for performing the particular operations. If it is determined that such authorization is required, application engine 202 may generate an authentication response and provide the authentication response via the user device 111 back to the user. The authentication response may request authentication information, such as a pin number, a secure code, an answer to a security question, etc. that may be used to authenticate the user. In some embodiment, the authentication response may request that the user be biometrically authenticated via a user device, such as a secure smart speaker device 114 equipped with biometric authentication. Once the biometric authentication is performed by secure smart speaker device 114, for example via a fingerprint, voice biometric, a retina scan, or vascular biometric, provided by the user to the secure smart speaker device 114, the secure smart speaker device 114 may provide a confirmation of a successful authentication response to application engine 202. Any suitable biometric authentication technique may be used with application engine 202 to authenticate the user. The biometric authentication may be performed, for example, by hardware at secure smart speaker device 114 and without the need to transfer any biometric data over the Internet. Based on the authentication information provided by the user via user device 111, application engine 202 may determine whether the user is authorized to request the operation, and application engine 202 may generate and transmit a corresponding server request only if it is determined that the user is authorized to request the operation. In some embodiments, application engine 202 may request that the user provide a pin, secondary authentication, or other identifying information, such as a code that the application engine 202 may send to an email address or a phone number, prior to accepting user requests from the user and/or prior to accepting user requests requesting particular operations.

In order to enable application engine 202 to request operations to be performed by servers 104-108 on behalf of a user, an embodiment of application engine 202 may implement a suitable process to obtain authorization from servers 104-108. For example, application engine 202 may obtain authorization in accordance with an open authorization (OAuth) framework or in accordance with another suitable framework. Obtaining authorization from a server may involve obtaining an access token from the server, and subsequently utilizing the access token (e.g., including the access token in a service request) to access specific applications on the server. An exemplary process utilized by application engine 202 to obtain an access token for a user is described in more detail below with reference to FIG. 3. In some embodiments, application engine 202 may obtain, respective access tokens for a particular user from multiple ones of servers 104-108 so that application engine 202 and may associate the respective access tokens with a corresponding user account in database 130. Application engine 202 may then utilize the access tokens obtained from servers 104-108 while interacting with a user via user device 111 to seamlessly transmission between requesting operations to be performed on behalf of the user by different ones of the servers 104-108. Application engine 202 may also obtain an access token from a voice assistant server 116 associated with a smart speaker device 114 of a user, and may utilize the access token to, for example, access voice assistant account information of the user via the voice assistant server 116.

In some embodiments, application engine 202 may be configured to establish secure channels between application engine 202 and one or more of computing user devices 113, smart speaker devices 114, and/or servers 104-108 and 116, to be used. Establishing secure channels may be desirable when implementing security-sensitive operations, such as banking operations. For example, application engine 202 may establish an encryption process that may allow application engine 202 to receive encrypted user requests, to decrypt the user requests, and to subsequently encrypt service requests generated based on the user requests prior to transmission of the service requests to servers 104-108.

Figure 3:
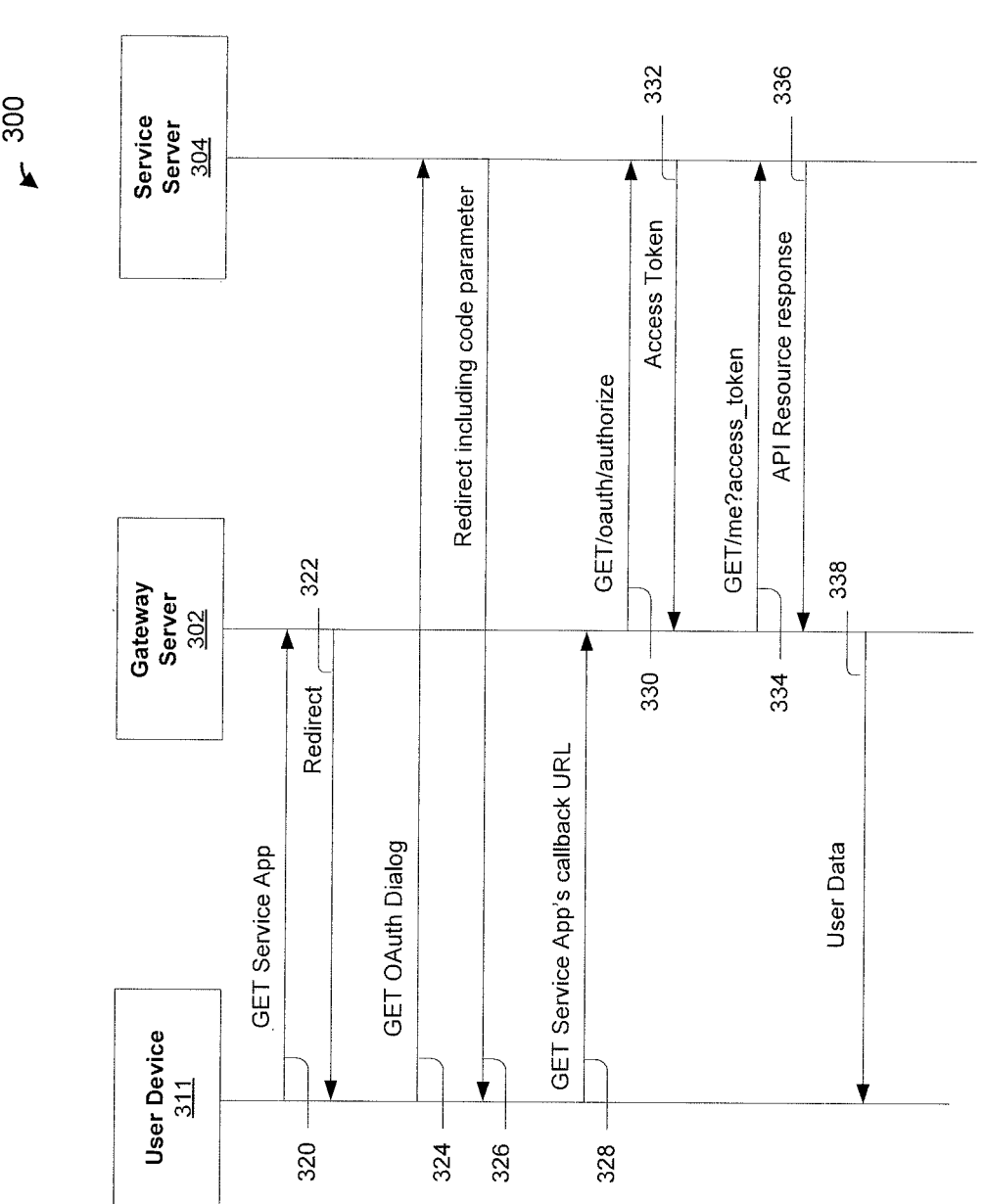
FIG. 3 is a diagram illustrating an authorization process implemented by the centralized gateway engine of FIG. 2, according to an embodiment.

FIG. 3 is a diagram illustrating an authorization process 300 that may be utilized by centralized gateway server 102 (e.g., application engine 202 running on centralized gateway server 102) to obtain authorization for accessing user accounts associated with service provider servers 104-108 and/or voice assistant servers 116, according to an embodiment. FIG. 3 illustrates interaction between a user device 311, a gateway server 302 and a service server 304. In an embodiment, user device 311 may correspond to user device 111, gateway server 302 may correspond to centralized gateway server 102 (e.g., application engine 202 running on centralized gateway server 102) and service server 304 may correspond to one of financial institution server 104, credit card provider server 106, merchant/service server 108 and voice assistant server 116.

User device 311 may initiate process 300 by transmitting a service application request 320 to gateway server 302. Service application request 320 may indicate a particular service for which a user of user device 311 wishes to allow access via gateway server 302. In response to service application request 320, gateway server 302 may generate and transmit a redirect message 322 to redirect user device 311 to service server 304 associated with the requested service. User device 311 may then transmit an authorization dialog request 324 to service server 304. Service server 304, which may correspond to one of financial institution server 104, credit card provider server 106, merchant/service server 108 and voice assistant server 116, may respond with a redirect message 326. Redirect message 326 may include an authorization code parameter. Redirect message 326 may redirect user device 311 to gateway server 304. In response to redirect message 326, user device 311 may transmit an authorization request 328 to gateway server 304. Authorization request 328 may include the code parameter provided by redirect message 326. Gateway server 302 may then transmit an authorization request 330, which may include the provided code parameter, to service server 304. In response, service server 304 may provide an access token of a particular user to gateway server 302. Gateway server 302 may subsequently request an operation by transmitting a service request 334 and including the access token of the particular user in service request 334. Service server 304 may utilize the access token to authenticate that gateway server 302 is authorized to request the operation, and, if authenticated, may provide a response 336 which may include data (e.g., an account balance, money transfer confirmation, etc.) associated with an API resource for performing the requested operation. Gateway server 302 may then transmit a response 338 to user device 302, to relay the received data to the user device 311.

Figure 4:
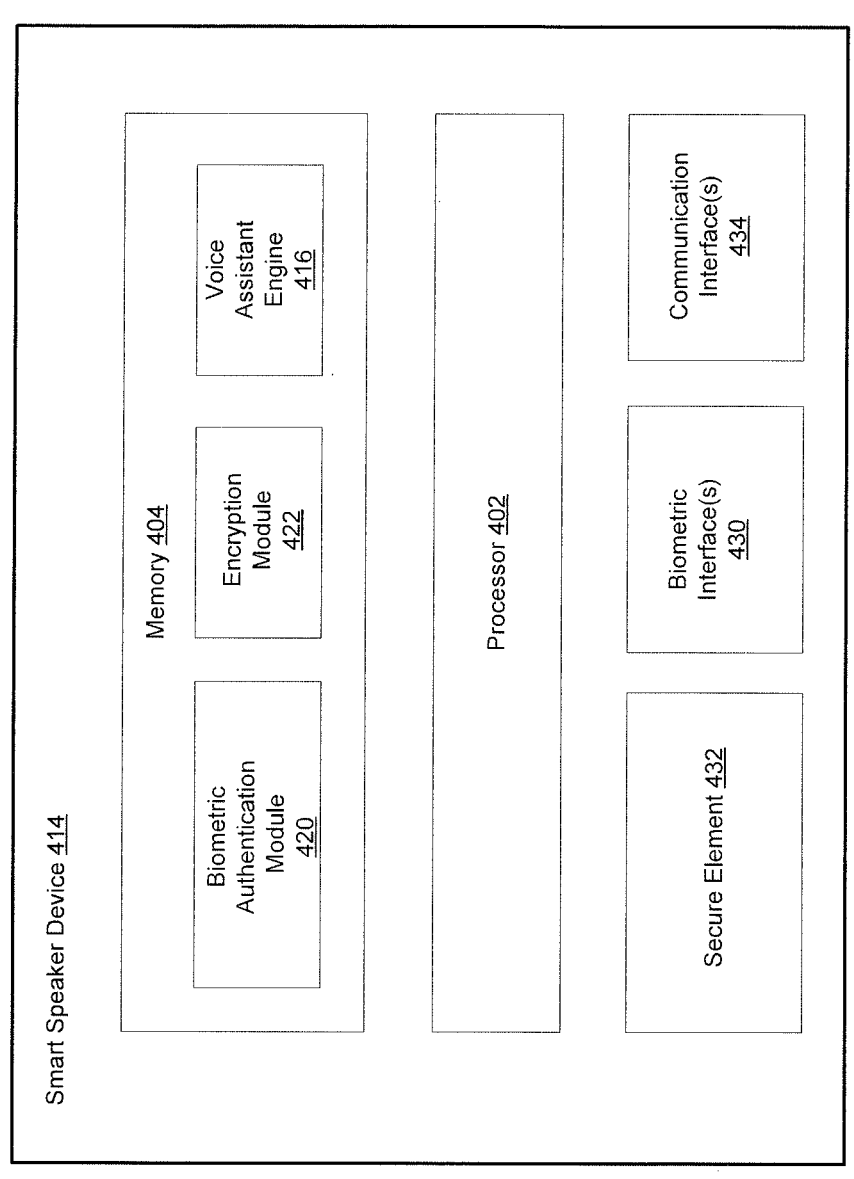
FIG. 4 is a block diagram of a secure smart speaker device that may be utilized with the system of FIG. 1, according to an embodiment.

FIG. 4 is a block diagram of a secure smart speaker device 414, according to an embodiment. Secure smart speaker device 414 may correspond to smart speaker device 114 of FIG. 1. Secure smart speaker device 414 may include a processor 402 and a computer-readable memory 404 that stores computer-readable instructions that may be executable by the processor 402. Computer readable memory 404 may include volatile memory to store computer instructions and data on which the computer instructions operate at runtime (e.g., Random Access Memory or RAM) and, in an embodiment, persistent memory such as a hard disk, for example. Computer readable memory may store a biometric authentication module 420, an encryption module 422, and a voice assistant engine 416.

Secure smart speaker device 414 may be equipped with one or more biometric interfaces 430, which may include a fingerprint pad, a retina scanner, voice recognition interface, etc., in various exemplary embodiments. Biometric authentication module 420 may be configured to receive inputs from one or more biometric interfaces 430 provided by a user and to compare the inputs with corresponding user data to authenticate the user. Biometric data corresponding to one or more users may be stored in a secure element device 432, for example. Such biometric data may be utilized for authenticating a particular user requesting secure operations via smart speaker device 414. In addition to or instead of biometric authentication performed using biometric inputs obtained via biometric interfaces 430, smart speaker device 414 may authenticate a user using a user's voice. For example, voice assistant engine 416 of smart speaker device 414 may utilize voice recognition to authenticate a user based on voice characteristics that may be stored in secure element 432. Secure element device 432 may include one or more security and/or tamper-resistance features to more securely store biometric data. For example, secure element device 432 may store biometric data in an encrypted form, making it difficult for an unwanted party to obtain the biometric data. Additionally, secure element device 432 may be disposed in tamper resistant packaging and/or may include tamper resistance hardware configured to prevent physical tampering with secure element device 432, in various embodiments. Secure element 432 may be configured to operate with one or more subscriber profiles, such as a subscriber identity module profiles (SIM profiles or simply SIMs) or electronic subscriber identity module profiles (e.g., eSIM profiles), that allow secure element 432 to connect to a network (e.g., mobile network) and to a enable user device (e.g., smart speaker device 414; user device 111) to communicate over the network. In various embodiments, secure element 432 may be an embedded universal circuit card (eUICC), or may be a removable UICC configured for subscriber profile operation. Also, secure element device 432 may be configured to store multi-user profiles into memory 404 which may obtained via an accompanying application or web portal, for example.

Secure smart speaker device 414 may utilize voice and/or biometric input authentication to only allow authorized users to issue any requests via secure smart speaker device 414 and/or to request particular secure operations via secure smart speaker device 414. In an exemplary embodiment, when a user provides a voice command to smart speaker device 414 for a particular secure operation (e.g., a banking operation), voice assistant engine 416 may perform voice recognition to authenticate the user and/or biometric authentication module 420 may request the user to provide input for biometric authentication. If voice and/or biometric input provided by the user matches the corresponding data stored in secure element device 432, then processor 402 may transmit a user request via a communication interface 434 to instruct centralized gateway server 102 to perform the requested operation. Prior to transmission of the user request, encryption module 422 may encrypt the user request. If, on the other hand, biometric input provided by the user does not match the corresponding biometric data stored in secure element 432, then processor 402 may omit and/or cease transmission of a user request via communication interface 434, thereby preventing the user from requesting the operation.

In another exemplary embodiment, smart speaker device 414 may transmit a user request to e.g., centralized gateway server 102 and, in response, may receive an authentication response from centralized gateway server 102. Biometric authentication module 420 may then request the user to provide input for biometric authentication. If biometric input provided by the user matches the corresponding biometric data stored in secure element 432, then processor 402 may transmit a confirmation of a successful authentication response to centralized gateway server 102. Centralized gateway server 102 may then perform the requested operation. If, on the other hand, biometric input provided by the user does not match the corresponding biometric data stored in secure element 432, then processor 402 may transmit a negative authentication request to centralized gateway server 102, thereby preventing centralized gateway server 102 from performing the operation.

FIG. 5 is a flow chart of a computer-implemented method 500 for providing access to services, according to an embodiment. Method 500 may be implemented by centralized gateway engine 124 of FIG. 1. In another embodiment, the method 500 may be implemented by a centralized gateway engine different from the centralized gateway engine 124 of FIG. 1.

At block 502, a first user request indicating a first operation to be performed on behalf of a first user is received. The first user request is configured to operate with a first development platform. The first user request may be generated using an application (e.g., a skill or action) developed on the first development platform. The first user request may conform to a format defined by the first development platform. In an embodiment, the first user request is received from a first voice assistant server that supports the first development platform. In another embodiment, the first user request is received from another suitable device that supports the first development platform.

At block 504, a first service request for performing the first operation on behalf of the first user is generated and, at block 506, the first service request is transmitted to a first server associated with a first service to cause the first server to perform the first operation on behalf of the first user. As an illustrative example, a first banking service request is generated at block 504, and the first banking request is transmitted at block 506 to a server associated with a fist bank to cause the server associated with the first bank to perform the first banking operation on behalf of the first user.

At block 508, a second user request indicating a second operation is received. In an embodiment, the second operation is to be performed on behalf of the first user. In another embodiment, the second operation is to be performed on behalf of a second user different from the first user. In an embodiment, the second user request is configured to operate with a second development platform different from the first development platform. The second user request may be generated using an application (e.g., a skill or action) developed on the second development platform. The second user request may conform to a format defined by the second development platform. In an embodiment, the second user request is received from a second voice assistant server that supports the second development platform. In another embodiment, the second user request is received from another suitable device that supports the second development platform.

At block 510, a second service request for performing the second operation is generated and, at block 512, the second service request is transmitted to the first server associated with the first service to cause the first server to perform the second operation. As an illustrative example, a second banking service request is generated at block 510, and the second banking request is transmitted at block 512 to the server associated with the first bank to cause the server associated with the first bank to perform the second banking operation. The method 500, thereby, enables the first bank to perform the first user request and the second user request transparently to the first development platform corresponding to the first user request and the second development platform corresponding to the second user request, in an embodiment.

Figure 6:
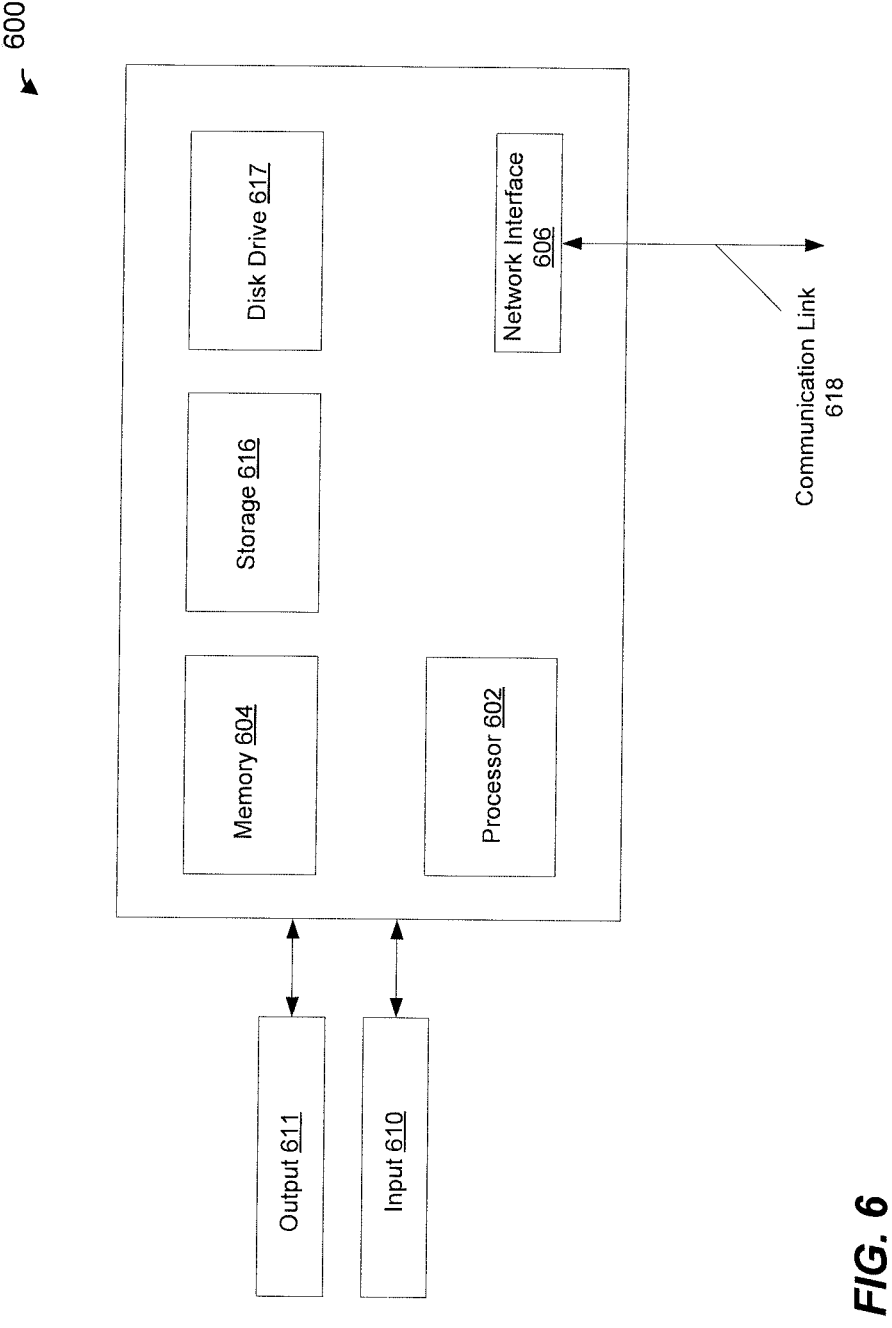
FIG. 6 is a block diagram of a computer system suitable for implementing one or more components of the system of FIG. 1, according to an embodiment.

FIG. 6 is a block diagram of a computer system 600 suitable for implementing one or more components of the system of FIG. 1, according to an embodiment. For example, one or more of the various user and server devices in FIG. 1 may be implemented on computing systems such as the computing system 600. In its most basic configuration, the computing system 600 may include at least one processor 602 and at least one memory 604. The computing device 600 may also include a bus (not shown) or other communication mechanism for communicating information data, signals, and information between various components of computer system 600. Components may include an input component 610 that processes a user action, such as selecting keys from a keypad/keyboard, selecting one or more buttons or links, etc., and sends a corresponding signal to the at least one processor 602. Components may also include an output component, such as a display, 611 that may display, for example, results of operations performed by the at least one processor 602. A transceiver or network interface 606 may transmit and receive signals between computer system 600 and other devices, such as user devices that may utilize results of processes implemented by the computer system 600. In one embodiment, the transmission is wireless, although other transmission mediums and methods may also be suitable.

The at least one processor 602, which can be a micro-controller, digital signal processor (DSP), or other process-ing component, processes these various signals, such as for display on computer system 600 or transmission to other devices via a communication link 618. The at least one processor 602 may also control transmission of information, such as cookies or IP addresses, to other devices. The at least one processor 602 may execute computer readable instruc-tions stored in the memory 604. The computer readable instructions, when executed by the at least one processor 602, may cause the at least one processor 602 to implement processes associated with determination of a user context, generation of customized translated content based on the user context, output of the customized translated content, etc. as described above.

Components of computer system 600 may also include at least one static storage component 616 (e.g., ROM) and/or at least one disk drive 617. Computer system 600 may perform specific operations by processor 612 and other components by executing one or more sequences of instruc-tions contained in system memory component 614. Logic may be encoded in a computer readable medium, which may refer to any medium that participates in providing instruc-tions to the at least one processor 602 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 616, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communica-tions.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware compo-nents and/or software components set forth herein may be separated into sub-components comprising software, hard-ware, or both without departing from the scope of the present disclosure. In addition, where applicable, it is con-templated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations have been described herein in terms of "modules" or "components," it is noted that that terms are not limited to single units or functions. Moreover, functionality attributed to some of the modules or compo-nents described herein may be combined and attributed to fewer modules or components. Further still, while the pres-ent invention has been described with reference to specific examples, those examples are intended to be illustrative only, and are not intended to limit the invention. It will be apparent to those of ordinary skill in the art that changes, additions or deletions may be made to the disclosed embodi-ments without departing from the spirit and scope of the invention. For example, one or more portions of methods described above may be performed in a different order (or concurrently) and still achieve desirable results.

What is claimed is:

1. A system for providing access to services across various development platforms, comprising:

a non-transitory memory for storing instructions;

one or more hardware processors that are coupled to the non-transitory memory and that are configured to execute the instructions to cause the system to perform operations comprising:

establishing a first secure channel connection between the system and a first voice assistant service provider server associated with a first service provider that supports a first development platform, wherein the establishing the first secure channel connection includes using biometric authentication to authenticate users and to ascertain that certain users are authorized to request certain banking operations, the certain bank-ing operations including one or more of open a banking account, open a card account, transfer funds between different banking accounts of the user, transfer funds from a banking account of the user to a third party's account, and receive currency exchange data;

receiving, via the established first secure channel connec-tion between the system and the first voice assistant service provider server, a first user request from the first voice assistant service provider server, the first user request indicating a first banking operation to be per-formed on behalf of a first user, the first user request configured to operate with the first development plat-form, wherein the first user request is received from the first voice assistant service provider server associated with the first voice assistant service provider that supports the first development platform;

performing biometric authentication based on the first user request and previously provided biometric input, the biometric authentication performed without trans-ferring biometric data to another device;

generating, when the previously provided biometric input matches the first user request, a first service request for performing the first banking operation on behalf of the first user in response to receiving the first user request; and transmitting, when the previously provided biometric input matches the first user request, the first service request to a first server associated with a first service, to cause the first server to perform the first banking operation on behalf of the first user.

2. The system of claim 1, wherein the one or more hardware processors that are coupled to the non-transitory memory and that are configured to execute the instructions to cause the system to perform operations further comprising:

prior to receiving the first user request, generating a user profile corresponding to the first user, the user profile including bank account information associated with a plurality of bank accounts of the first user including at least (i) first bank account information associated with a first bank account of the first user and (ii) second bank account information associated with a second bank account of the first user.

3. The system of claim 2, wherein generating the first service request includes (i) receiving input configured to select the first bank account from among the plurality of bank accounts in the user profile and (ii) generating the first service request using the first bank account information associated with the first bank account selected based on the received input.

4. The system of claim 3, wherein receiving input configured to select the first bank account includes:

generating a response to the first user request, the response requesting a selection of a bank account associated with the first user, providing the response via the first voice assistant service provider to the first user, and receiving, from the first voice assistant service provider, the selection of the bank account made by the first user, the selection indicating the first bank account to be selected for performing the first banking operation on behalf of the first user.

5. The system of claim 2, wherein the first banking operation to be performed on behalf of the first user is to transfer money from the first bank account at a first bank to the second bank account at a second bank, wherein the second bank is different from the first bank.

6. The system of claim 1, wherein generating the first service request includes:

determining whether the first user is authorized to request the first banking operation, and generating the first service request only in response to determining that the first user is authorized to request the first banking operation.

7. The system of claim 1, wherein the one or more hardware processors that are coupled to the non-transitory memory and that are configured to execute the instructions to cause the system to perform operations further comprising:

receiving a second user request from a second service provider server, the second user request indicating a second banking operation, the second user request configured to operate with a second development platform different from the first development platform, wherein the second user request is received from a second voice assistant service provider server associated with a second voice assistant service provider that supports the second development platform different from the first development platform, and wherein the second banking operation is to be performed on behalf of a second user different from the first user;

performing biometric authentication based on the second user request and previously provided biometric input, the biometric authentication performed without transferring biometric data to another device;

generating, when the previously provided biometric input matches the second user request, a second service request for performing the second banking operation in response to receiving the second user request; and transmitting, when the previously provided biometric input matches the second user request, the second service request to the first server associated with the first service, to cause the first server to perform the second banking operation, wherein the first service request comprises a first access token corresponding to the first user that is obtained from the first server for authorizing the first banking operation, the second service request comprises a second access token corresponding to the second user obtained from the first server for authorizing the second banking operation, and the first service request and the second service request are configured to operate without a separate application of the first server configured to perform the first and second banking operations.

8. The system of claim 7, wherein the one or more hardware processors that are coupled to the non-transitory memory and that are configured to execute the instructions to cause the system to perform operations further comprising:

prior to receiving the second user request from the second voice assistant service server, establishing, a second secure channel connection between the system and the second voice assistant service provider server, and wherein receiving the second user request comprises receiving the second user request via the second secure channel connection between the system and the second voice assistant service provider server.

9. The system of claim 7, wherein the one or more hardware processors that are coupled to the non-transitory memory and that are configured to execute the instructions to cause the system to perform operations further comprising:

prior to transmitting the second service request to the second service server, establishing a second secure channel connection between the system and the second service server, and wherein transmitting the second server request comprises transmitting the second server request via the second secure channel connection between the system and the second service server.

10. A method for providing access to services across various development platforms, the method comprising:

establishing a first secure channel connection between a centralized gateway server and a first voice assistant service provider server associated with a first service provider that supports a first development platform, wherein the establishing the first secure channel connection includes using biometric authentication to authenticate users and to ascertain that certain users are authorized to request certain banking operations, the certain banking operations including one or more of open a banking account, open a card account, transfer funds between different banking accounts of the user, transfer funds from a banking account of the user to a third party's account, and receive currency exchange data;

receiving, at the centralized gateway server via the established first secure channel connection between the central gateway server and the first voice assistant service provider server, a first user request from the first voice assistant service provider server, the first user request indicating a first banking operation to be performed on behalf of a first user, the first user request configured to operate with the first development platform, wherein the first user request is received from the first voice assistant service provider server associated with the first voice assistant service provider that supports the first development platform;

performing biometric authentication based on the first user request and previously provided biometric input, the biometric authentication performed without transferring biometric data to another device;

generating, at the centralized gateway server when the previously provided biometric input matches the first user request, a first service request for performing the first banking operation on behalf of the first user in response to receiving the first user request; and transmitting, when the previously provided biometric input matches the first user request, the first service request to a first server associated with a first service, to cause the first server to perform the first banking operation on behalf of the first user.

11. The method of claim 10, further comprising:

prior to receiving the first user request, generating, with the centralized gateway server, a user profile corresponding to the first user, the user profile including bank account information associated with a plurality of bank accounts of the first user including at least (i) first bank account information associated with a first bank account of the first user and (ii) second bank account information associated with a second bank account of the first user.

12. The method of claim 11, wherein generating the first service request includes (i) receiving input configured to select the first bank account from among the plurality of bank accounts in the user profile and (ii) generating the first service request using the first bank account information associated with the first bank account selected based on the received input.

13. The method of claim 12, wherein receiving input configured to select the first bank account includes:

generating a response to the first user request, the response requesting a selection of a bank account associated with the first user, providing the response via the first voice assistant service provider to the first user, and receiving, from the first voice assistant service provider, the selection of the bank account made by the first user, the selection indicating the first bank account to be selected for performing the first banking operation on behalf of the first user.

14. The method of claim 10, further comprising:

receiving, at the centralized gateway server, a second user request from a second service provider server, the second user request indicating a second banking operation, the second user request configured to operate with a second development platform different from the first development platform, wherein the second user request is received from a second voice assistant service provider server associated with a second voice assistant service provider that supports the second development platform different from the first development platform, and wherein the second banking operation is to be performed on behalf of a second user different from the first user;

performing biometric authentication based on the second user request and previously provided biometric input, the biometric authentication performed without transferring biometric data to another device;

generating, at the centralized gateway server when the previously provided biometric input matches the second user request, a second service request for performing the second banking operation in response to receiving the second user request; and transmitting, from the centralized gateway server when the previously provided biometric input matches the second user request, the second service request to the first server associated with the first service, to cause the first server to perform the second banking operation, wherein the first service request comprises a first access token corresponding to the first user that is obtained from the first server for authorizing the first banking operation, the second service request comprises a second access token corresponding to the second user obtained from the first server for authorizing the second banking operation, and the first service request and the second service request are configured to operate without a separate application of the first server configured to perform the first and second banking operations.

15. The method of claim 11, wherein the first banking operation to be performed on behalf of the first user is to transfer money from the first bank account at a first bank to the second bank account at a second bank, wherein the second bank is different from the first bank.

16. A tangible, non-transitory computer readable medium, or media, storing machine-readable instructions that, when executed by one or more processors, cause the one or more processors to:

establish a first secure channel connection between a centralized gateway server and a first voice assistant service provider server associated with a first service provider that supports a first development platform, wherein the establishing the first secure channel connection includes using biometric authentication to authenticate users and to ascertain that certain users are authorized to request certain banking operations, the certain banking operations including one or more of open a banking account, open a card account, transfer funds between different banking accounts of the user, transfer funds from a banking account of the user to a third party's account, and receive currency exchange data;

receive, via the established first secure channel connection between the central gateway server and the first voice assistant service provider server, a first user request from the first voice assistant service provider server, the first user request indicating a first banking operation to be performed on behalf of a first user, the first user request configured to operate with the first development platform, wherein the first user request is received from the first voice assistant service provider server associated with the first voice assistant service provider that supports the first development platform;

perform biometric authentication based on the first user request and previously provided biometric input, the biometric authentication performed without transferring biometric data to another device;

generate, when the previously provided biometric input matches the first user request, a first service request for performing the first banking operation on behalf of the first user in response to receiving the first user request; and transmit, when the previously provided biometric input matches the first user request, the first service request to a first server associated with a first service, to cause the first server to perform the first banking operation on behalf of the first user.

* * * * *